Sept. 22, 1970 M. F. RADFORD 3,530,485

SCANNING AERIAL SYSTEMS AND ASSOCIATED FEEDER ARRANGEMENTS THEREFOR

Filed Aug. 16, 1967

3 Sheets-Sheet 1

INVENTOR
Matthew Frederick Radford
BY
Baldwin Wight Diller & Brown
ATTORNEYS

INVENTOR
Matthew Frederick Radford
BY
Baldwin Wight Diller & Brown
ATTORNEYS

INVENTOR
Matthew Frederick Radford
BY
Baldwin Wight Diller & Brown
ATTORNEYS

United States Patent Office 3,530,485
Patented Sept. 22, 1970

3,530,485

SCANNING AERIAL SYSTEMS AND ASSOCIATED FEEDER ARRANGEMENTS THEREFOR

Matthew Frederick Radford, Essex, England, assignor to The Marconi Company Limited, London, England, a British company Filed Aug. 16, 1967, Ser. No. 660,951
Claims priority, application Great Britain, Aug. 31, 1966, 38,929/66
Int. Cl. H01q 3/26, 1/50, 21/00
U.S. Cl. 343—854 11 Claims

ABSTRACT OF THE DISCLOSURE

Circular aerial arrays which use electronic rather than mechanical scanning do not normally obtain a good polar diagram. The invention gives a good polar diagram using a number of aerial elements spaced round a circle. The elements are divided into sets and units, each set having the same number of equally spaced elements and each unit consisting of a number of different corresponding elements. Power from a power dividing feeder is switched to the aerial elements of a different unit through switches. The feeder paths include hybrids and phase shifters so that equal powers reach all units. Scanning in elevation as well as azimuth may be achieved using a number of aerial systems coaxially mounted one above the other.

Figures 1, 2:
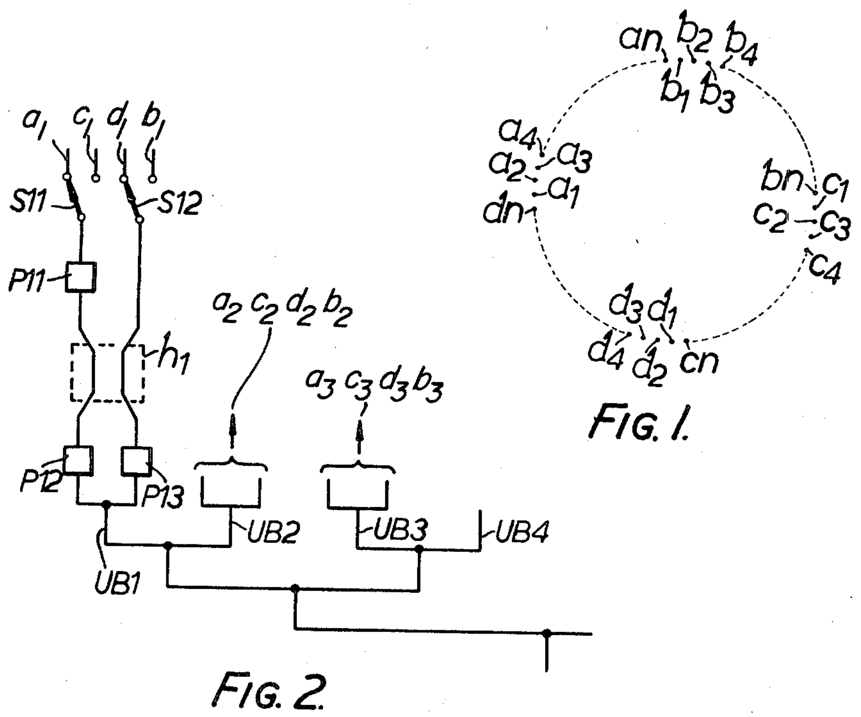

This invention relates to scanning aerial systems and associated feeder arrangements and more specifically to space scanning aerial systems and associated feeder arrangements of the kind in which at least one circular aerial array, i.e. an array comprising aerial elements lying on the circumference of a circle, is fed through a controllable feeder arrangement which is such that the aerial can scan space in azimuth without being mechanically moved. Such scanning, which is usually called and is herein called, "electronic scanning," may be simply scanning in azimuth or there may be scanning in elevation as well.

There is a need, notably in the case of large computer controlled radars, to provide purely electronic scanning in order to avoid the limitations inherent in arrangements in which scanning is effected by mechanically rotating or swinging an aerial about an axis of rotation. A very suitable form of aerial array for use when electronic scanning is required in the so-called circular array, for if, for example, scanning through 360° in azimuth is required, such an array has fewer aerial elements than a square or triangular array (i.e. one with the array elements lying along the sides of a square or triangle) of equivalent gain. Moreover a circular array gives the same gain irrespective of direction whereas a square or triangular array does not. However, a circular array pesents the difficulty that, in order to obtain a satisfactorily good polar diagram, it is necessary to change the amplitudes as well as the phases fed to the different aerial elements when effecting electronic scanning.

There are known ways of overcoming this difficulty. One way, which will be found described in a paper entitled "A transformation between the phasing techniques required for linear and circular arrays" by D. E. N. Davies in Proc. I.E.E., vol. 112, No. 11, November 1965, makes use of a so-called Butler Matrix This method, however, involves the provision of equipment of very considerable complexity and is unsuitable for adoption with large arrays. Another method, described in a paper entitled "Cylindrical arrays with electronic beam scanning" by D. E. N. Davies and B. S. McCartney in Proc. I.E.E., vol. 112, No. 3, March 1965, is also somewhat complex and is suitable for adoption with receiving aerial arrays only. The present invention seeks to provide improved and relatively simple circular aerial systems and associated feeder arrangements which will give purely electronic scanning, if required over 360°, which shall be suitable for use for transmitting or receiving, which are well adapted for adoption with large arrays, and which shall give satisfactorily good polar radiation diagrams.

According to this invention an aerial and associated feeder system adapted to provide electronic scanning of space (for example under control by a computer) comprises an aerial system consisting of a plurality of aerial elements spaced along a circular arc, said aerial elements being divided into sets and units each set consisting of the same plurality of adjacent equally spaced aerial elements and each unit consisting of a plurality of different corresponding aerial elements, at least one in each set; and a power dividing feeder system branched into unit branches each leading via feeder paths to the aerial elements of a different unit through switch means whereby different predetermined combinations of aerial elements may be selected for connection to the unit feeder branch therefor, the feeder paths to the aerial elements of each unit from the unit branch therefor also including at least one hybrid and phase shifting means, the whole arrangement being such that equal powers are fed to all the units.

Preferably the switch means included between each unit branch and the aerial elements comprising the unit associated therewith is adapted, in each of a plurality of different switching positions provided for said switching means, to select a plurality of corresponding aerial elements equally divided among different sets for connection to said unit branch, the feeder paths from said unit branch to the selected corresponding aerial elements including hybrid parts, and means providing different phase shifts in said feeder paths.

In one way of carrying out the invention corresponding aerial elements in adjacent sets are spaced arcuately by 90° and the switch means included between each unit branch and the aerial elements comprising the unit associated therewith is arranged, in one switching position, to select for connection two corresponding aerial elements spaced by 90° and, in the other switching positions, to select for connection any two other corresponding aerial elements which are also spaced by 90°.

In another way of carrying out the invention corresponding aerial elements in adjacent sets are spaced arcuately by 60° and the switch means included between each unit branch and the unit associated therewith is arranged, in one switching position, to select for connection two corresponding aerial elements spaced by 60° and, in the other switching positions, to select for connection any two other corresponding aerial elements which are also spaced by 60°.

The invention may be applied to arrangements in which electronic scanning in elevation as well as in azimuth is obtained. Such an arangement may comprise a cylindrical aerial array consisting of a plurality of similar component circular aerial systems, arranged vertically one above the other and each consisting of a plurality of aerial elements spaced along a circular arc and divided into sets and units, a power dividing feeder system branched into unit branches being provided for each component aerial system. Alternatively such an arrangement may comprise a cylindrical aerial array consisting of a plurality of similar component vertical linear arrays spaced along a circular arc and fed as the elements of a single circular azimuth scanning system as previously described. If, in such an arrangement, elevation scanning is effected by low power phase shifters associated with the aerial elements of each linear array, these may be designed to provide the required azimuth phasing as well, in which case it will be sufficient to provide only one phase shifter in associated with each hybrid. Where, however, a circular (as distinct from a cylindrical) aerial array is used without elevation scanning, three phase shifters are provided in association with each hybrid.

In all cases a central vertical linear aerial array may be provided in addition and used, in manner known per se, for target height finding.

The invention is illustrated in and further explained in connection with the accompanying simplified drawings.

Figures 3, 4:
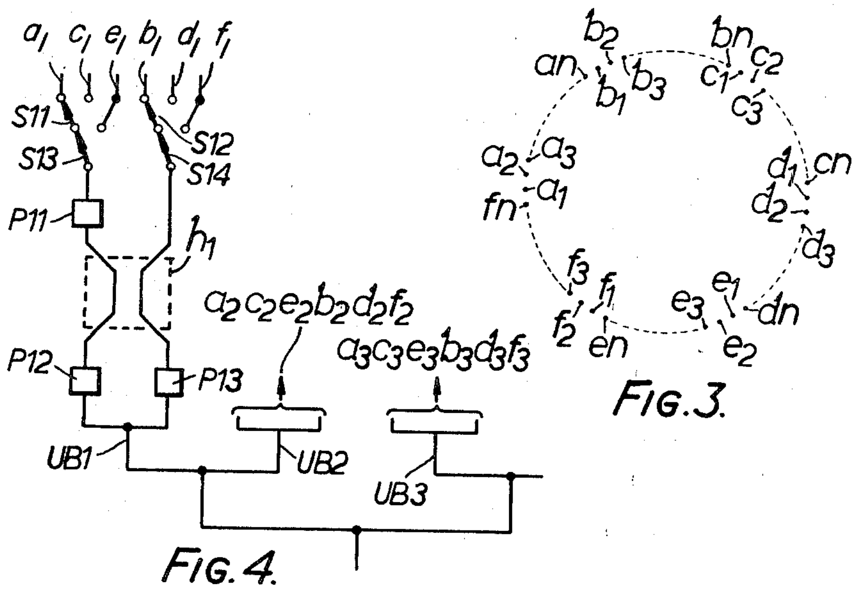
Figure 5:
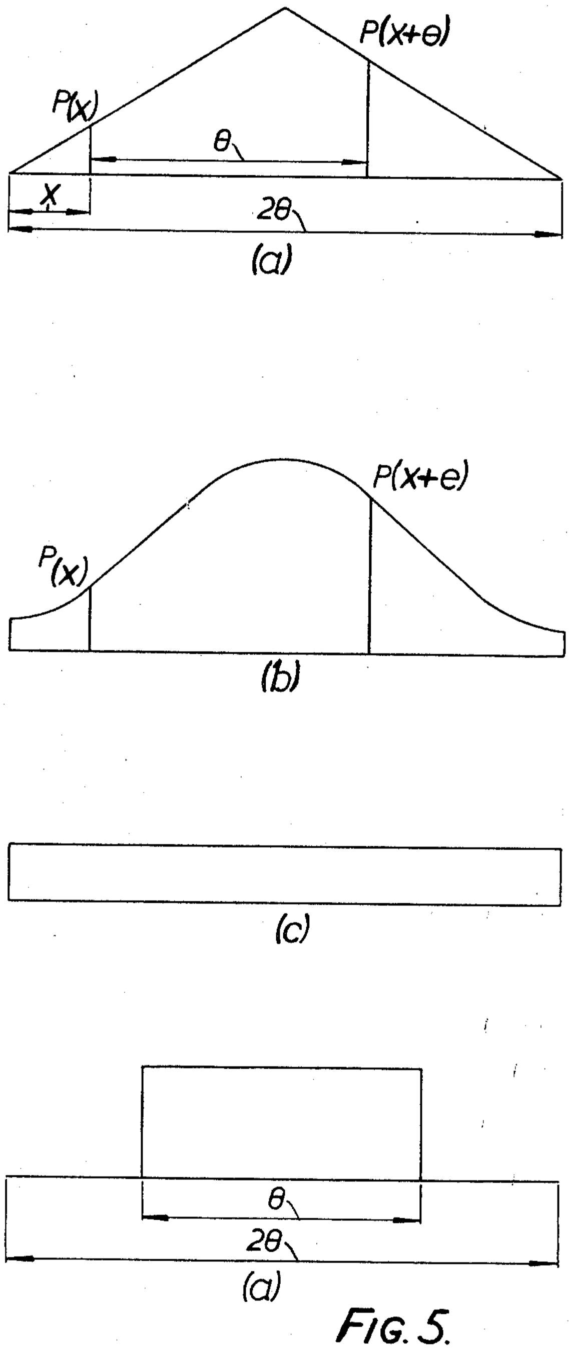
Figure 6:
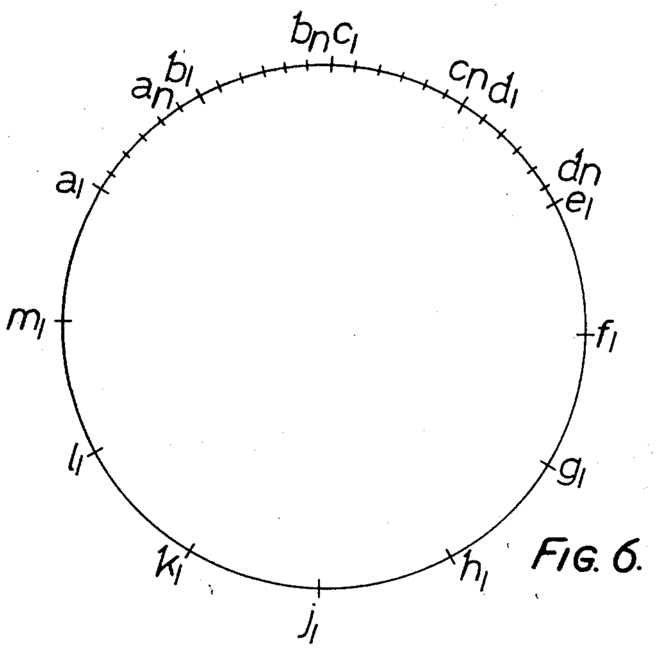
Figure 7:
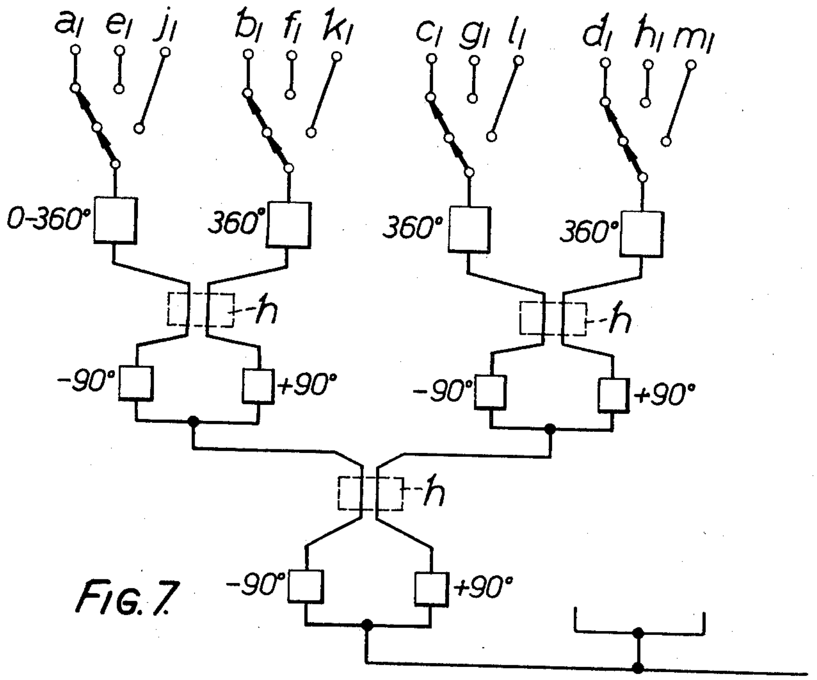

In the drawings FIGS. 1 and 2 show one embodiment of the invention, FIGS. 3 and 4 show a preferred modification, FIG. 5 is a set of possible power distribution curves, and FIGS. 6 and 7 show a further modification.

Referring to FIGS. 1 and 2 which show, respectively and diagrammatically, one form of circular aerial system and part of the feeder system therefor, the aerial system shown comprises four sets of aerial elements $a_1a_2 \ldots a_n$; $b_1b_2 \ldots b_n$; $c_1c_2 \ldots c_n$ and $d_1d_2 \ldots d_n$. Adjacent aerial elements are spaced apart by, for example, half a wavelength. In FIG. 1 the aerial elements, comprising the different unit consist of the elements $a_1b_1c_1d_1$; $a_2b_2c_2d_2 \ldots$ and so on.

FIG. 2 shows, in detail, the feeder connections to the aerial elements of the unit $a_1b_1c_1d_1$ and indicates those to the elements of the units $a_2b_2c_2d_2$ and $a_3b_3c_3d_3$. The connections to all the units (including those not shown) are similar.

As will be seen from FIG. 2, the feeder system is a power dividing system which branches down, at a succession of "forks" into a number of unit branches UB1, UB2, UB3, UB4 . . . and so on, each for one aerial element unit. Taking the case of the fully illustrated unit branch UB1, this divides into two paths each including a phase shifter P12 or P13 and leading to the two inputs of a hybrid $h_1$ the outputs of which are taken to the arms S11, S12 of two switches (shown for convenience of drawing as electro-mechanical switches, through electronic switching can be used), the connection to the arm S11 including a phase shifter P11 and that to the arm S12 being direct. In a modification a single phase shifter is included in one of the two connections from the hybrid $h_1$ to the branch UB1 and a phase shifter is included in each of the two connections from the hybrid $h_1$ to the switches S11 and S12. In another modification phase shifters may be included in all four of the connections of the hybrid, the phase excursions of the two phase shifters between UB1 and the said hybrid being halved. In one switching position connection is made to the aerial elements $a_1b_1$ and in the other to the elements $b_1c_1$,$c_1d_1$ or $d_1a_1$. Thus two corresponding elements of adjacent sets in each unit are energised at any one time. The required constraint is thus placed upon the amplitude distribution, equal powers being fed to all units. The switches select the elements to be energised and the phase shifters and hybrids determine the phase and amplitude distributions in accordance with known principles. The two switches suffice to select any two elements in adjacent sets in the same unit, for it is never necessary to feed a pair 180° apart. The single hybrid and three phase shifters shown is sufficient to give the required complete phase and amplitude control in each unit. Only two of the phase shifters require a 360° phase excursion and the other need only 180° to give complete control. Alternatively two 360° and two 90° phase shifters may be employed to keep losses symmetrical within the unit. If N is the Number of aerial elements there will be $N/2$ switches, $3N/4$ phase shifters and $N/4$ hybrids.

FIGS. 3 and 4 show, in manner similar to that employed in FIGS. 1 and 2 respectively, a preferred modification in which there are six aerial element sets $a_1$ to $a_n$, $b_1$ to $b_n$, $c_1$ to $c_n$, $d_1$ to $d_n$, $e_1$ to $e_n$, and $f_1$ to $f_n$, corresponding elements (such as $a_1b_1c_1d_1e_1$ and $f_1$) of adjacent sets being spaced by 60° arcuately. Each branch unit (such as UB1) is associated with a different aerial unit each such unit consisting of six aerial elements. The feeder path arrangement at each branch unit (only that for UB1 is shown but the others are similar) comprises a hybrid $h_1$ three phase shifters P11, P12 and P13 and four switches S11, S12, S13, S14, by means of which the aerial elements may be selected (in manner which will be self-evident from FIG. 4), two at a time, for connection to the branch unit UB1. Whereas the arrangement of FIGS. 1 and 2 "illuminates" a 180° arc at any time, that of FIGS. 3 and 4 "illuminates" a 120° arc at any time. By making each feeder branch unit feed three or more aerial elements, a greater degree of freedom in choosing the amplitude distribution can be obtained. Assuming a minimum beam width of about 1° in the highest gain condition is required with azimuth scanning through 360°, practical figures for the circular aerial would be 384 (i.e. 6×64) aerial elements on a circle of a diameter of 60 wavelengths. The choice of numbers having a simple binary form simplifies the design of both the power dividers and the computing system. If the required minimum bandwith in the highest gain condition were 2° the number of aerial elements required and the diameter of the circle would be halved. If a low sidelobe level is required a correspondingly wider beam is obtained with the same number of elements.

As already stated the invention can be employed in equipments providing scanning in elevation as well as in azimuth and incorporating an aerial array which is cylindrical as distinct from merely circular, i.e. which comprises a plurality of similar aerial systems such as that of FIG. 3, co-axially mounted one above the other. In such a case if elevation scanning is effected (in manner known per se and not illustrated) by means of low power phase shifters, only one phase shifter is required per hybrid in each azimuth scanning aerial unit in order to determine the amplitude distribution, the azimuth phasing being provided by the low power phase shifters. Thus, for example, considering a 60° arrangement like that of FIGS. 3 and 4, if the said arrangement were employed as part of an azimuth and elevation scanning equipment with a cylindrical aerial array and elevation scanning obtained by low power phase shifters (not shown), the phase shifters P11 and P13 could be omitted and only the phase shifter P12 retained, the low power phase shifters providing the azimuth phasing. In similar circumstances the arrangement of FIGS. 1 and 2 can be similarly modified.

In all cases a central vertical aerial may be provided and used in manner known per se for target height finding. This, however, is not per se part of this invention and will not be further described herein.

An additional and important advantage of the invention arises from the fact that a computer employed to effect scanning can set up its own amplitude distribution as well as the phase distribution. Accordingly both the gain and sidelobe characteristics of the aerial can be controlled e.g. a high gain or a low sidelobe pattern can be chosen at will. By varying the amplitude distribution without changing the phase distribution, the beam can be maintained directed on to a target while the sidelobes are modified. By choosing appropriate distributions, alternate clockwise and anti-clockwise "homing" beams may be selected in rapid succession and improved azimuthal accuracy thereby obtained.

FIGS. 5(*a*) to (*d*) show in conventional graphical manner, some of the many possible power distributions all of which satisfy the equation:

$$P(x)+P(x+\theta)=\text{constant}$$

$x$ and $\theta$ are shown in FIG. 5(*a*). $\theta$ is also shown, for obvious reasons, in FIG. 5(*d*). The four power distribution curves chosen for illustration in (*a*), (*b*), (*c*) and (*d*) of FIG. 5 may be termed, respectively, "gable" distribution, "raised cosine power" distribution, "constant power" distribution, and "half aperture constant power" distribution. These terms will be, it is thought, self explanatory from figures in question.

The invention is obviously not limited to the particular arrangements so far described and illustrated. Thus, for example, in place of the arrangement of FIGS. 1 and 2 with two 90° arcs or that of FIGS. 3 and 4 with two 60° arcs use could be made of four 30° arcs (out of the twelve which make up the complete circle, with four fed elements (instead of two) in each unit. Such employment of four fed elements in place of two eases the constraint on amplitude distribution and thus permits better (i.e. lower) sidelobe levels to be achieved. In such an arrangement there would be, for each unit, four 360° phase shifts, three hybrids, three 180° phase shifts and four three-way switching networks arranged to feed four elements out of twelve. Such an arrangement is shown in FIGS. 6 and 7 in much the same way as is adopted for the embodiments illustrated in FIGS. 1 and 2 and in FIGS. 3 and 4. In FIGS. 6 and 7 the twelve 30° arcs are the arcs $a_1b_1$; $b_1c_1$; $c_1d_1$; $d_1e_1$; $e_1f_1$; $f_1g_1$; $g_1h_1$; $h_1j_1$; $j_1k_1$; $k_1l_1$; $l_1m_1$; and $m_1a_1$; the 360° phase shifters are so marked; the 180° phase shifts are obtained by +90° and −90° phase shifters as indicated and the hybrids are referenced *h*. There is a power splitting feed (partly shown) as before. The constraint upon the amplitude distribution is now that the power in $a_i+b_i+c_i+d_i$ is a constant and for all $l \leq i \leq n$.

I claim:

1. An aerial and associated feeder system adapted to provide electronic scanning of space comprising an aerial system consisting of a plurality of aerial elements spaced along a circular arc, said aerial elements being divided into sets and units each set consisting of the same plurality of adjacent equally spaced aerial elements and each unit consisting of a plurality of different coresponding aerial elements, at least one in each set; and a power dividing feeder system branched into unit branches each leading via respective feeder paths to the aerial elements of a different unit through switch means, said switch means providing selective connection of different predetermined combinations of aerial elements to the unit branch therefor effecting beam scanning, the feeder paths to the aerial elements of each unit from the unit branch therefor including at least one hybrid and at least one phase shifting means, the whole arrangement being such that equal powers are fed to all the units.

2. A system as claimed in claim 1 wherein a portion of said switch means is included between each unit branch and the unit associated therewith is adapted, in each of a plurality of different switching positions provided for said switching means, to select a plurality of corresponding aerial elements, equally divided among different sets for connection to said each unit branch, the feeder paths from said each unit branch to the selected corresponding aerial elements including hybrid parts and means providing different phase shifts in said feeder paths.

3. A system as claimed in claim 2 wherein the portion of said switch means included between each unit branch and the unit associated therewith is adapted, in each of a plurality of different switching positions provided for said switching means, to select two corresponding aerial elements, one in each of two different sets, for connection to said each unit branch, the feeder paths from said each unit branch to the two selected corresponding aerial elements including two parts of a hybrid and means providing different phase shifts in said feeder paths.

4. A system as claimed in claim 2 wherein the portion of said switch means included between each unit branch and the aerial elements comprising the respective unit associated therewith is adapted, in each of a plurality of different switching positions provided for said switch means, to select four corresponding aerial elements, one in each of four different sets, for connection to said unit branch, the feeder paths from said unit branch to the four selected corresponding elements including hybrid parts, and means providing different phase shifts in said feeder paths.

5. A system as claimed in claim 3 wherein corresponding aerial elements in adjacent sets are spaced arcuately by 90° and the portion of said switch means included between each unit branch and the aerial elements comprising the respective unit associated therewith is arranged, in one switching position, to select for connection two corresponding aerial elements spaced by 90° and, in the other switching positions, to select for connection any two other corresponding aerial elements which are also spaced by 90°.

6. A system as claimed in claim 3 wherein corresponding aerial elements in adjacent sets are spaced arcuately by 60° and the portion of said switch means included between each unit branch and the aerial elements comprising the unit associated therewith is arranged, in one switching position, to select for connection two corresponding aerial elements spaced by 60° and, in the other switching positions, to select for connection any two other corresponding aerial elements which are also spaced by 60°.

7. A system as claimed in claim 4, wherein corresponding aerial elements in adjacent sets are spaced arcuately by 30° and the portion of said switch means included between each unit branch and the aerial elements comprising the unit associated therewith is arranged, in one switching position, to select for connection four corresponding aerial elements spaced by 90° and in the other switching positions to select for connection any four other corresponding aerial elements also spaced by 90°.

8. A system as claimed in claim 1 adapted to scan in elevation as well as in azimuth said system including a cylindrical aerial array comprising a plurality of component aerial systems as defined in claim 1 arranged vertically one above the other and each consisting of a plurality of respective aerial elements spaced along a circular arc and divided into respective sets and respective units, and a power dividing feeder system branched into said unit branches.

9. A system as claimed in claim 8 wherein elevation scanning is effected by low power phase shifters associated with the elements of each linear array said phase shifters being designed also to provide the azimuth phasing.

10. A system as claimed in claim 6 adapted to scan in elevation as well as in azimuth said system including a cylindrical aerial array comprising a plurality of component aerial systems as defined in claim 6 arranged vertically one above the other and each consisting of a plurality of respective aerial elements spaced along a circular arc and divided into respective sets and respective units, and a power dividing feeder system branched into said unit branches.

11. A system as claimed in claim 7 adapted to scan in elevation as well as in azimuth said system including a cylindrical aerial array comprising a plurality of component aerial systems as defined in claim 7 arranged vertically one above the other and each consisting of a plurality of respective aerial elements spaced along a circular arc and divided into respective sets and respective units, and a power dividing feeder system branched into said unit branches.

References Cited

UNITED STATES PATENTS

| | | | |
|---|---|---|---|
| 3,056,961 | 10/1962 | Mitchell | 343—854 |
| 3,176,297 | 3/1965 | Forsberg | 343—854 X |
| 3,255,450 | 6/1966 | Butler | 343—853 X |
| 3,276,018 | 9/1966 | Butler | 343—854 X |
| 3,295,134 | 2/1966 | Lowe | 343—854 X |

HERMAN K. SAALBACH, Primary Examiner

T. VEZEAU, Assistant Examiner

U.S. Cl. X.R.

343—844, 857